United States Patent [19]

Althoff

[11] 4,221,306
[45] Sep. 9, 1980

[54] VIBRATING FEEDER

[75] Inventor: Klaus Althoff, Remscheid-Lüttringhausen, Fed. Rep. of Germany

[73] Assignee: "Rhewum" Rheinische Werkzeug-und Maschinenfabrik GmbH, Remscheid-Lüttringhausen, Fed. Rep. of Germany

[21] Appl. No.: 949,103

[22] Filed: Oct. 6, 1978

[30] Foreign Application Priority Data

Oct. 8, 1977 [DE] Fed. Rep. of Germany ........ 2745432

[51] Int. Cl.³ ............................................ B65G 27/20
[52] U.S. Cl. .................................... 222/200; 198/770
[58] Field of Search ........................ 222/196, 199, 200; 198/752, 763, 766, 770, 771; 209/365 R, 366.5, 367, 370, 920

[56] References Cited

U.S. PATENT DOCUMENTS

| | | | |
|---|---|---|---|
| 3,338,385 | 8/1967 | Sage | 198/771 |
| 3,348,664 | 10/1967 | Renner | 198/763 X |
| 3,954,604 | 5/1976 | Krause et al. | 209/365 R X |

FOREIGN PATENT DOCUMENTS

| | | |
|---|---|---|
| 861224 | 12/1952 | Fed. Rep. of Germany . |
| 1531046 | 5/1967 | Fed. Rep. of Germany . |
| 1266684 | 4/1968 | Fed. Rep. of Germany . |
| 7108278 | 5/1971 | Fed. Rep. of Germany . |
| 2263876 | 12/1972 | Fed. Rep. of Germany . |

*Primary Examiner*—F. J. Bartuska
*Attorney, Agent, or Firm*—Spencer & Kaye

[57] ABSTRACT

A vibrating feeder for receiving bulk material and discharging it in even distribution has a housing, a base supported in the housing at a sloping orientation and a vibrator oscillating the base. The base has a downwardly narrowing width defined by an oblique discharge edge. Resilient components connect the base to the housing to provide for a free oscillation of the base with respect to the housing. The vibrator is operatively connected solely with the base.

3 Claims, 3 Drawing Figures

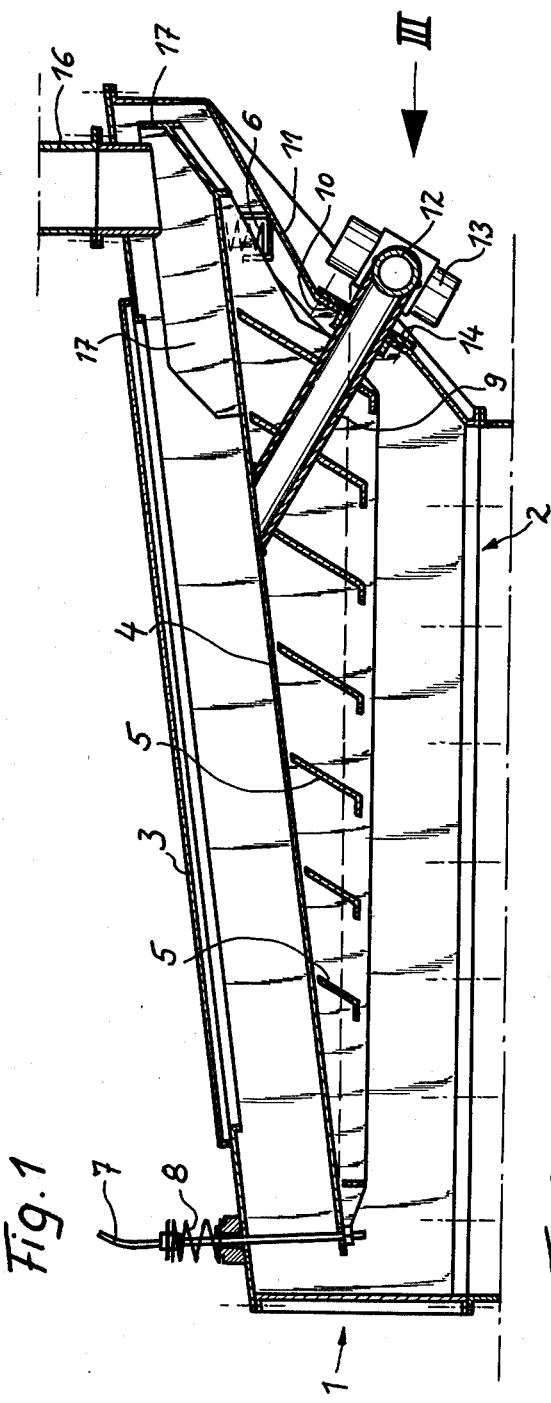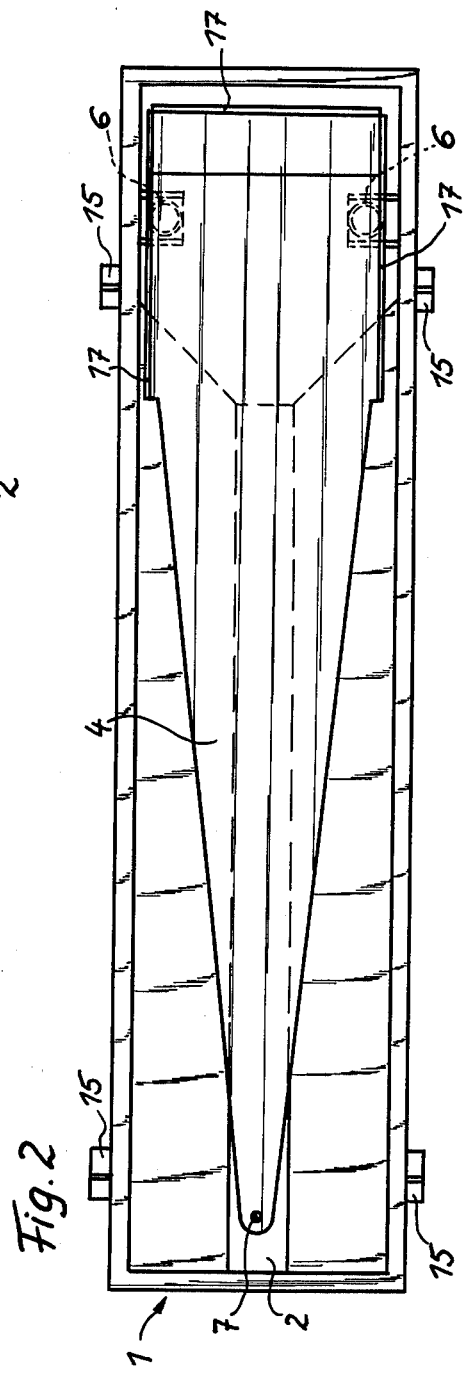

VIBRATING FEEDER

BACKGROUND OF THE INVENTION

This invention relates to a vibrating feeder, particularly for uniformly charging sifting machines. The bulk material is introduced to the upper end portion of an inclined, vibratable feeder base arranged in a housing. The bulk material is discharged by gravity over at least one oblique edge of the base, the width of which narrows in the downward direction.

Vibrating feeders of the above-outlined type are known and are disclosed, for example, in German Utility Model (Gebrauchsmuster) No. 7,108,278. They insure that the material is introduced in a uniform distribution along the entire screening width of a sifting machine. The vibrating feeder comprises an elongated housing and a housing base rigidly connected with the housing walls. The housing base (feeder base) has an inclined orientation and its width decreases towards the lower end portion of the base to thus form at least one discharge edge which extends approximately diagonally with respect to the housing walls. Further, the downwardly open housing has elastic supports and at least two vibrators mounted at each longitudinal side of the housing. The vibrators are usually unbalanced motors.

SUMMARY OF THE INVENTION

It is an object of the invention to provide an improved vibrating feeder of the above-outlined type, whose efficiency and versatility are increased and its installation is simple and economical.

This object and others to become apparent as the specification progresses, are accomplished by the invention, according to which, briefly stated, the feeder housing has devices for the stationary positioning of the vibrating feeder and further, the feeder base is supported by elastic elements to provide for a free vibration of the base and also, there is provided at least one vibrator which agitates solely the feeder base.

The driving power required to operate the vibrating feeder according to the invention as defined above can be substantially reduced compared to known feeders, for the same input flow rate of the bulk material, since, according to the invention, only the floor has to be vibrated, rather than the entire housing as it was the case in prior art arrangements.

Further, the invention makes it possible to mount the housing of the feeder according to the invention directly to the frame of an after-connected sifting machine or the like, without thereby transferring dynamic forces from the vibrating feeder to the after-connected machine and without adversely affecting the screening effect of the sifting machine by the vibrating feeder.

According to a further feature of the invention which is particularly advantageous from the manufacturing point of view, the feeder base is suspended in a stable manner by means of elastic suspension members, the effective length of which is adjustable. This optimally simple and inexpensive arrangement further permits to vary, in a simple manner, the inclination of the base even during operation.

In accordance with a further feature of the invention, the vibrator is mounted at the underside of the base, at least approximately in its center of gravity.

In accordance with a further feature of the invention, from the underside of the feeder base, there extends a plunger which is oriented in the operational direction of the vibrator and which projects through the housing without contacting the same. Externally of the housing, the plunger carries the vibrator and further, the opening in the housing through which the plunger extends is closed by elastic dust proof seals. In this manner, the efficiency of the vibrating feeder is, in an economical manner, further increased and simultaneously, a uniform distribution of the material over the entire width of the after-connected sifting machine is ensured.

Also, the vibrator is, at all times, freely accessible and is safely separated from the bulk material without any additional expense.

It is a further feature of the invention to provide, at the input end of the base, material guiding plates or the like which project upwardly at least along the longitudinal sides of the base.

BRIEF DESCRIPTION OF THE DRAWINGS

FIG. 1 is a sectional side elevational view of a preferred embodiment of the invention.

FIG. 2 is a top plan view of the same embodiment with its lid removed.

DESCRIPTION OF THE PREFERRED EMBODIMENT

Figure 3:
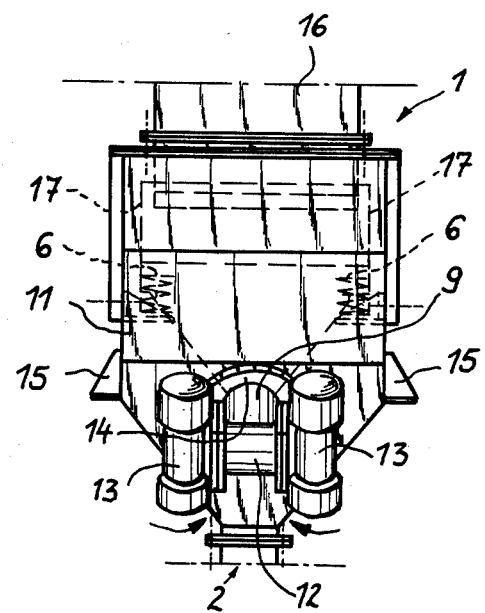
FIG. 3 is a front elevational view of the same embodiment as seen in the direction of the arrow III of FIG. 1.

Turning now to the Figures, the vibrating feeder shown therein has a generally rectangular housing 1, the longitudinally extending side walls of which form, at their lower portion, an outlet 2, the width of which is less than the width of the upper housing opening. For this purpose, the lateral walls converge towards one another downwardly. The upper opening of the housing is partially closable by a removable lid 3.

In the housing 1 there is arranged a base 4 which extends substantially along the entire length of the housing. The base 4 has essentially the shape of an isosceles triangle and slopes downwardly in the direction of the narrowed end portion of the housing. In order to achieve a superior form stability, the base 4 has the shape of a downwardly open trough and is provided with webs 5 which bridge the lateral flanges of the base.

The base 4 is freely swingably supported in the housing. For this purpose, the wide end of the base rests on the housing 1 with the interposition of elastic supports 6 constituted by coil springs which thus maintain the base 4 in the desired orientation. At the narrow end portion of the base 4 there is secured a suspension member 7 constituted by a cable, the upper end portion of which is mounted on the housing 1 with the interposition of an elastic member 8 constituted by a coil spring. The upper end portion of the cable 7 is longitudinally adjustably connected with the coil spring 8 to provide for an arbitrary setting of the inclination of the base 4.

From the underside of the floor 4, in the center of gravity thereof, there extends a plunger 9 which projects through an opening 10 provided in the housing wall 11 and carries, externally of the housing 1, a transverse member 12 to which there are mounted two oppositely operating unbalanced motors 13. The opening 10 is closed by means of an elastic seal 14. Externally of the housing there are secured mounting wings 15.

Into the housing 1 there merges a tubular inlet hopper 16 which is rigidly connected with the housing 1 and which is oriented towards the wide portion of the base 4. In this zone the base 4 is provided with upwardly extending guide plates 17 for guiding the bulk material.

It is to be understood that the above description of the present invention is susceptible to various modifications, changes and adaptations, and the same are intended to be comprehended within the meaning and range of equivalents of the appended claims.

What is claimed is:

1. In a vibrating feeder for receiving bulk material and discharging it in even distribution, including a housing of substantially rectangular outline having a length and a width; a bulk material inlet means arranged at an upper portion of the housing at one end thereof; a base accommodated in the housing and extending substantially along the entire length thereof; the base sloping downwardly from the inlet means and decreasing in width with increasing distance from the inlet means whereby the base has an upper, wide end and a lower, narrow end; the base further having a center of gravity, a top side, an underside and at least one longitudinal edge extending at an inclination to the length of the housing; said longitudinal edge forming a bulk material discharge means; support means for mounting the base in the housing; and a vibrator operatively coupled with the base for imparting vibrations to the base whereby bulk material introduced through the inlet means to said top side of the base is assisted in its distribution over the surface of the base and discharge over said longitudinal edge; the improvement wherein said support means consist exclusively of first elastic support means directly connecting said wide end of said base with said housing and second elastic support means directly connecting said narrow end of said base with said housing; said second elastic support means having length adjusting means situated externally of the housing for being accessible to arbitrarily vary the inclination of said base; the improvement further comprising connecting means for coupling said vibrator to said base, said connecting means comprising a plunger projecting through said housing and having a first end affixed to said underside of said base at least approximately at said center of gravity; said plunger further having a a second end carrying said vibrator externally of said housing; said plunger constituting the sole component transmitting vibrations of said vibrator to said base.

2. A vibrating feeder as defined in claim 1, wherein said plunger projects through a clearance provided in said housing; further comprising resilient sealing means for the dust proof closing of said clearance.

3. A vibrating feeder as defined in claim 1, wherein said base has the shape of an elongated isosceles triangle whose two sides constitute two longitudinal discharge edges of said base; said longitudinal discharge edges forming said bulk material discharge means.

* * * * *